United States Patent
Manadhata (10) Patent No.: US 10,764,307 B2
(45) Date of Patent: Sep. 1, 2020

(54) EXTRACTED DATA CLASSIFICATION TO DETERMINE IF A DNS PACKET IS MALICIOUS

(71) Applicant: Hewlett Packard Enterprise Development LP, Houston, TX (US)

(72) Inventor: Pratyusa K. Manadhata, Piscataway, NJ (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 136 days.

(21) Appl. No.: 15/573,872

(22) PCT Filed: Aug. 28, 2015

(86) PCT No.: PCT/US2015/047497
§ 371 (c)(1),
(2) Date: Nov. 14, 2017

(87) PCT Pub. No.: WO2017/039591
PCT Pub. Date: Mar. 9, 2017

(65) Prior Publication Data
US 2018/0295142 A1 Oct. 11, 2018

(51) Int. Cl.
*G06F 12/14* (2006.01)
*H04L 29/06* (2006.01)
(Continued)

(52) U.S. Cl.
CPC .......... *H04L 63/1416* (2013.01); *H04L 29/06* (2013.01); *H04L 43/00* (2013.01);
(Continued)

(58) Field of Classification Search
CPC ..... G06F 21/561; H04L 69/22; H04L 67/327; H04L 63/14; H04L 63/0245; H04L 61/1511
(Continued)

(56) References Cited

U.S. PATENT DOCUMENTS 7,757,283 B2   7/2010   Robert et al.
7,926,108 B2   4/2011   Rand et al.
(Continued)

FOREIGN PATENT DOCUMENTS

CN   101005390 A   7/2007
CN   103944788 A   7/2014
(Continued)

OTHER PUBLICATIONS

Yadav et al, Detecting Algorithmically Generated Domain-Flux Attacks with DNS Traffic Analysis, IEEE, vol. 20, No. 5, Oct. 2012, pp. 1663-1677.*

(Continued)

*Primary Examiner* — Alexander Lagor
*Assistant Examiner* — Jenise E Jackson
(74) *Attorney, Agent, or Firm* — Hewlett Packard Enterprise Patent Department (57) ABSTRACT

Examples herein disclose an extraction of data from a payload field within a domain name system (DNS) packet. The extracted data is classified according to a level of risk associated with the extracted data. Based on the classification, the DNS packet may be determined as malicious.

16 Claims, 7 Drawing Sheets

(51) Int. Cl.
*H04L 29/08* (2006.01)
*H04L 12/26* (2006.01)

(52) U.S. Cl.
CPC .......... *H04L 63/1425* (2013.01); *H04L 67/10* (2013.01); *H04L 67/12* (2013.01); *H04L 67/42* (2013.01); *H04L 69/22* (2013.01)

(58) Field of Classification Search
USPC .......................................................... 726/23
See application file for complete search history.

(56) References Cited

U.S. PATENT DOCUMENTS

| | | | |
|---|---|---|---|
| 8,451,806 B2 | 5/2013 | Kumar et al. | |
| 8,874,723 B2 | 10/2014 | Terasaki et al. | |
| 8,898,773 B2 | 11/2014 | Kummu et al. | |
| 9,021,079 B2 | 4/2015 | Pulleyn et al. | |
| 2003/0005157 A1* | 1/2003 | Chung | H04L 29/12132 709/245 |
| 2008/0253380 A1 | 10/2008 | Cazares et al. | |
| 2011/0302656 A1 | 12/2011 | El-Moussa | |
| 2012/0047571 A1 | 2/2012 | Duncan et al. | |
| 2014/0096251 A1 | 4/2014 | Doctor et al. | |
| 2015/0106909 A1 | 4/2015 | Chen et al. | |
| 2015/0195291 A1 | 7/2015 | Zuk et al. | |
| 2015/0195299 A1 | 7/2015 | Zoldi et al. | |
| 2016/0014147 A1* | 1/2016 | Zoldi | H04L 63/1433 726/23 |
| 2016/0026796 A1* | 1/2016 | Monrose | G06F 21/562 726/24 |
| 2016/0269442 A1* | 9/2016 | Shieh | H04L 63/20 |
| 2017/0272454 A1* | 9/2017 | Seo | H04L 1/203 |
| 2017/0366507 A1* | 12/2017 | Hastings | H04L 63/0254 |
| 2018/0034738 A1* | 2/2018 | Zsohar | H04L 43/026 |
| 2018/0109494 A1* | 4/2018 | Yu | H04L 63/1425 |

FOREIGN PATENT DOCUMENTS

| | | |
|---|---|---|
| CN | 104246788 A | 12/2014 |
| KR | 102008006395 | 7/2008 |
| KR | 102012007299 | 7/2012 |
| KR | 102012008739 | 8/2012 |
| KR | 10-1187023 B1 | 9/2012 |
| KR | 101538374 | 7/2015 |
| WO | WO-2014138205 | 9/2014 |

OTHER PUBLICATIONS

Takemori et al, Detection of Bot Infected PCs Using Destination-Based IP and Domain Whitelists During a Non-Operation Term, 2008, IEEE, pp. 1-6.*

Extended European Search Report, EP Application No. 15903182.2, dated Mar. 21, 2018, pp. 1-8, EPO.

International Search Report and Written Opinion received for PCT Patent Application No. PCT/US2015/047524, dated Jun. 13, 2016, 10 pages.

International Search Report and Written Opinion received for PCT Patent Application No. PCT/US2015/047497, dated Jun. 13, 2016, 9 pages.

International Preliminary Report on Patentability received for PCT Patent Application No. PCT/US2015/047524, dated Mar. 15, 2018, 9 pages.

International Preliminary Report on Patentability received for PCT Patent Application No. PCT/US2015/047497, dated Mar. 15, 2018, 8 pages.

Arrow ECS, Channel Advisor, published by CPI Media Group, Issue 2, Oct. 2014, 28 pages.

Efficient iP, Secure and Hardened DNS Appliances for the Internet, Datasheet, 2013, 7 pages.

* cited by examiner

EXTRACTED DATA CLASSIFICATION TO DETERMINE IF A DNS PACKET IS MALICIOUS

BACKGROUND

A Domain Name System (DNS) enables applications to find resources on the Internet based on user-friendly names (e.g., domain names) rather than a dot-decimal notation. In the DNS system, a client may use a domain name to request an Internet Protocol (IP) address.

BRIEF DESCRIPTION OF THE DRAWINGS

In the accompanying drawings, like numerals refer to like components or blocks. The following detailed description references the drawings, wherein.

DETAILED DESCRIPTION

In the DNS system, a client may use a domain name to request the IP address; however, the domain names may be malicious. Malicious domain names are considered unsafe as the domains may be operated with malicious intent or purpose. Such malicious domain names may be identified by processing a header within a DNS packet. For example, a source of the DNS packet is identified and based on whether the source is considered malicious, the DNS packet may in turn be classified as malicious. This is inefficient as the source of the DNS packet may not be infected, but the source may be directing packets to the malicious domain name. Further this example may be unreliable as the source may appear to be non-infected, thus the DNS packet may be incorrectly labeled as benign.

To address these issues, examples disclosed herein provide a reliable and efficient mechanism to identify whether a DNS packet is malicious. The examples determine whether the DNS packet is malicious based on a classification of extracted data within a payload field. The examples extract data from the payload field within the DNS packet and classify the extracted data in accordance with a level of risk. Based on the classification of the level of risk, the examples identify whether the DNS packet is malicious. Classifying the extracted data within the payload field provides a more reliable and accurate mechanism to identify whether the DNS packet is malicious.

In other examples if the DNS packet is labeled as malicious, the examples log the DNS packet. If the DNS packet is labeled as benign, the examples discard the DNS packet. Discarding the DNS packet if identified as benign allows much of the benign DNS traffic to be dropped. This also provides additional efficiency as it reduces the overall amount of traffic which is logged.

In other examples discussed herein, to classify the extracted data in accordance with the level of risk includes identifying whether the extracted data corresponds to a list of known malicious domains. If the extracted data corresponds to none of the known malicious domains, the examples may subsequently proceed to identify whether the extracted data corresponds to a list of known benign domain names. Processing the extracted data against the list of known malicious domain names prior to the list of known benign names provide additional reliability by capturing much of the malicious traffic.

Figure 1:
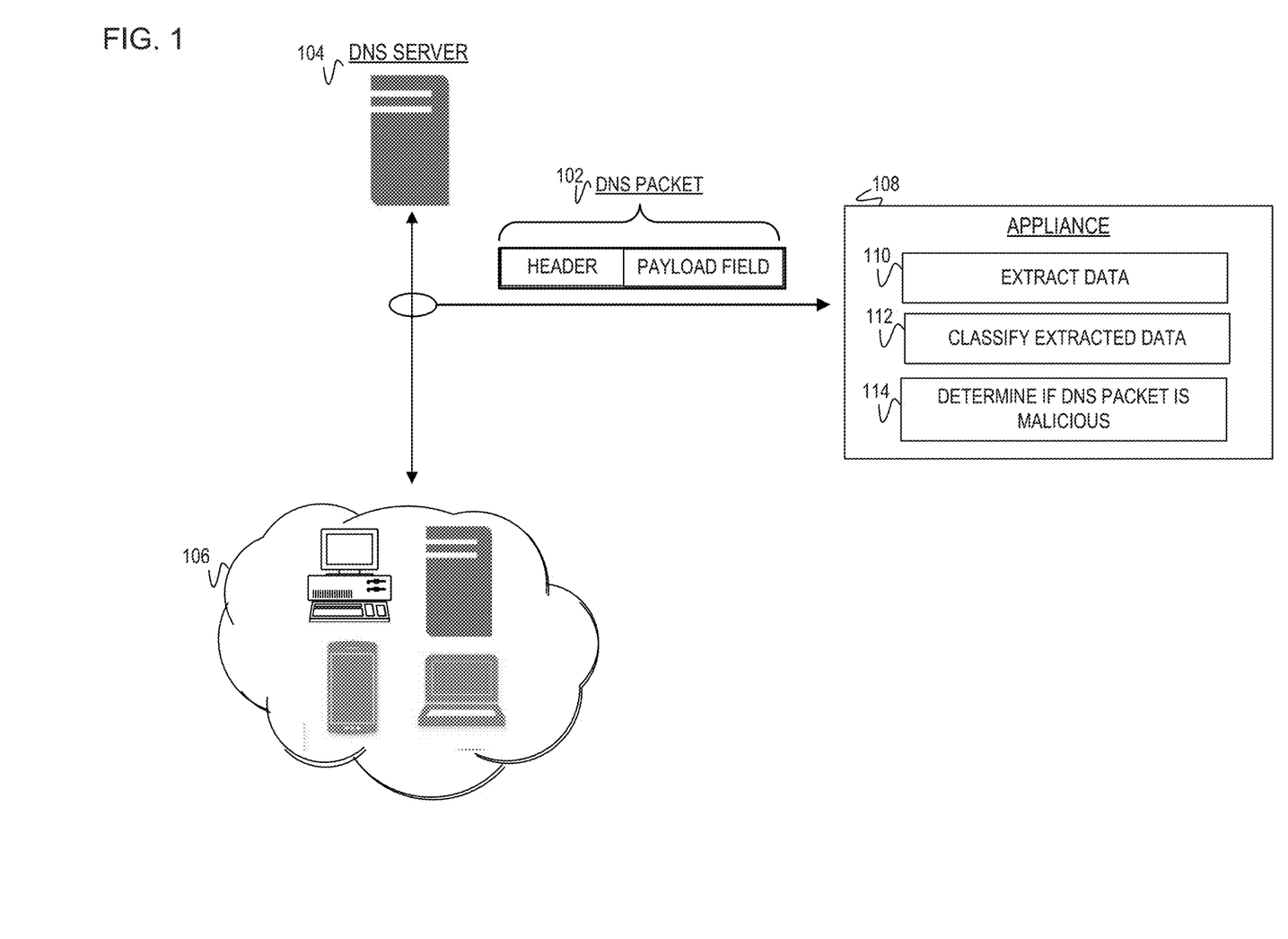
FIG. 1 is a block diagram of an example system including an appliance to capture a DNS packet from traffic between a client and DNS server.

Referring now to the figures, FIG. 1 is a block diagram of a system including an appliance 108 to capture a DNS packet 102 from traffic between a DNS server 104 and a client 106. The appliance 108 extracts data from the payload field within the DNS data packet 102 at module 110. Using the extracted data, the appliance 108 classifies the extracted data according to a level of risk associated with the extracted data at module 112. Classifying the extracted data according to the level of risk, the appliance 108 may proceed to determine if the DNS packet is malicious at module 114. The system in FIG. 1 represents a networking system to receive and transmit DNS traffic. As such, implementations of the system include a domain name system (DNS) networking, wide area network, legacy network, local area network (LAN), Ethernet, optic cable network, software defined network (SDN), or other type of networking system capable of handling DNS traffic. Although FIG. 1 illustrates the system as including components 104, 106, and 108 implementations should not be limited as the system may include additional components such as an auxiliary appliance and/or additional DNS server. This implementation may be discussed in detail in the next figure.

The DNS packet 102 is considered a networking data packet which is a formatted unit of data carried as DNS traffic between the client(s) 106 and the DNS server 104. The DNS packet 102 consists of at least two kinds of data including a header and the payload field. The header describes various information such as the type of packet (e.g., DNS), which payload fields are contained in the DNS packet 102, etc. The header may include the IP header and the DNS header as part of the DNS packet 102. Following the header are a number of payload fields. The payload fields are those fields in the DNS packet 102 which contains the data for extraction. In one implementation, the data which is extracted by the appliance is a domain name in which the client 106 is seeking the corresponding IP address, Implementations of the payload fields may include, by way of example, a query field, a response field, an authority field, and an additional field.

The DNS server 104 is a name server which implements a network service for providing responses to queries against a directory service. The DNS server 104 receives a service protocol request from the client 106 to translate a domain name into an IP address which is transmitted back to the requestor. In response the DNS server 104 returns the IP address to the requestor (e.g., client 106). In another implementation, the DNS server 104 is used to identify and locate a computer system and resources on the Internet corresponding to the domain name. Accordingly, the DNS server 104 is a computing system to provide the network services, such as data storage, Internet connectivity, and providing responses to queries against the directory service. As such, implementations of the DNS server 104 include a. Local Area Network (LAN) server, web server, cloud server, network server, file server, or other type of computing device capable of receiving domain name requests and returning an IP address(es) in responses.

The client 106 is a networking component that accesses the directory services as provided by the DNS server 104. In this manner, the client 106 exchanges DNS traffic with the DNS server. As such, the client 106 transmits DNS requests with the domain name to the DNS server 104 and receives DNS responses with the requested IP address, Implementations of the client 106 include a router, server, mobile device, computing device, networking switch, virtual networking component or other type of networking component cable of exchanging DNS traffic with the DNS server 104. Although the client 106 includes multiple computing devices to exchange DNS traffic with the DNS server 104, implementations should not be limited as the client may include a single computing device and/or a virtual device.

The appliance 108 captures the DNS packet 102 from the DNS traffic between the DNS server 104 and the client(s) 106. In one implementation, the appliance 108 captures a copy of packet which is transmitted as the traffic. In this implementation, the appliance 108 operates in the background of the DNS traffic between the DNS server 104 and the client(s) 106. The appliance 108 is considered a networking device which is dedicated to the data extraction and classification of the extracted data. As such implementations of the appliance 108 include, by way of example, a router, server, a networking switch, a computing device, a virtual networking component, or other type of networking component capable of extracting data and classifying the extracted data.

At modules 110-114, the appliance 108 determines whether the DNS packet is malicious based on the classification of the extracted data. The appliance 108 extracts data from the payload field of the DNS packet 102. Using the extracted data, the appliance 108 proceeds to classify the extracted data according to the level of risk. The level of risk indicates to the appliance 108 whether the DNS packet is malicious. For example, a high level of risk classification of the extracted data indicates the DNS packet is malicious. In another example, a low level of risk classification of the extracted data indicates the DNS packet is not malicious and may mean that the DNS packet is benign. This may be discussed in detail in later figures. The modules 110-114 may include, by way of example, instructions (e.g., stored on a machine-readable medium) that, when executed (e.g., by the appliance 108), implement the functionality of modules 110-114. Alternatively, or in addition, the modules 110-114 may include electronic circuitry (i.e., hardware) that implements the functionality of modules 110-114.

Figure 2:
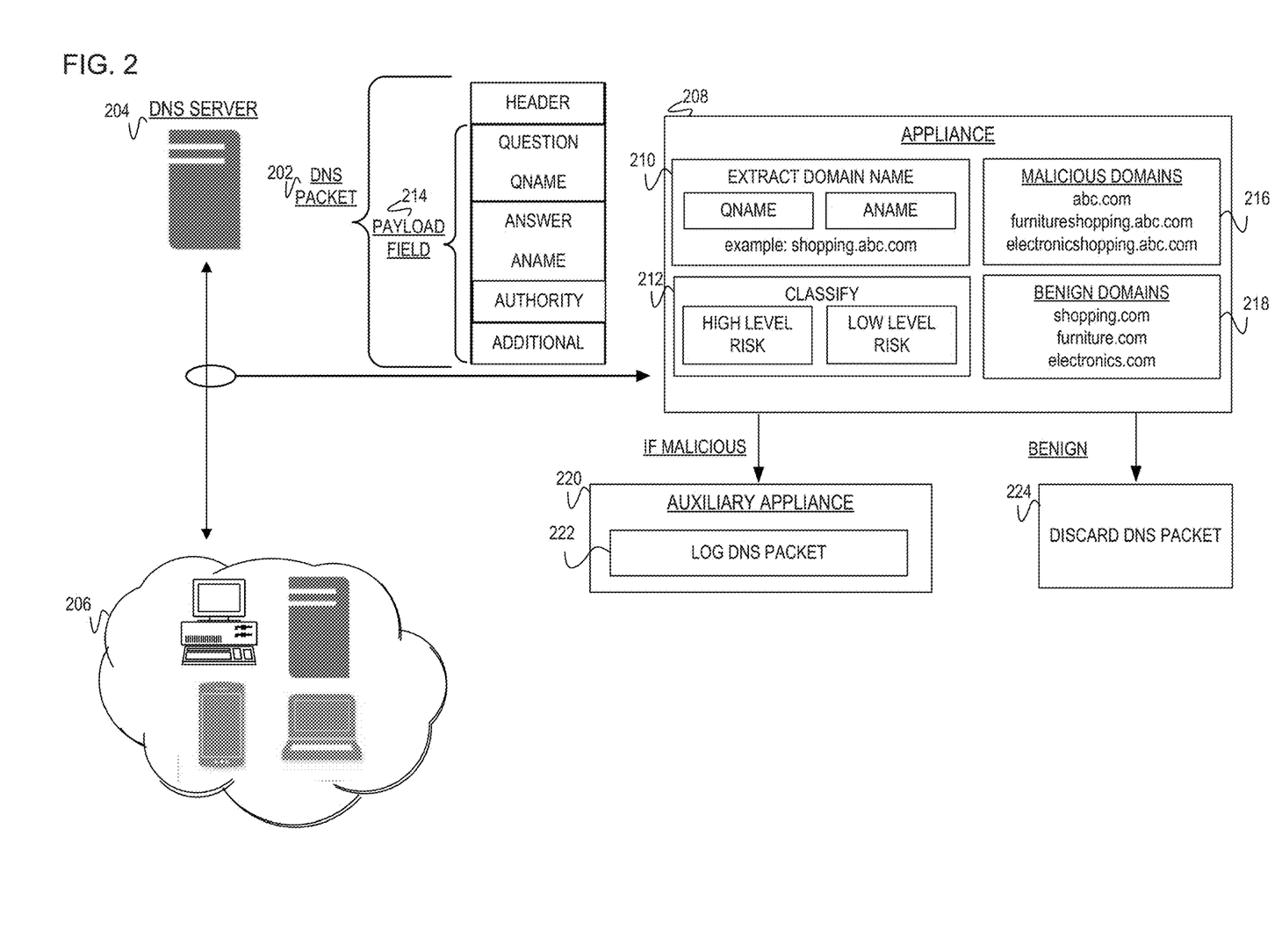
FIG. 2 is a block diagram of an example system including an appliance to determine if a. DNS packet is malicious based on an extraction of a domain name from a payload field within the DNS packet.

FIG. 2 is a block diagram of an example system including an appliance 208 to capture a DNS packet 202 from DNS traffic between a client 206 and a DNS server 204. The DNS packet 202 includes a header and payload fields 214. The appliance 208 extracts a domain name from the payload fields 214 at module 210. In implementations, the extracted domain name may include a qname and/or aname. Based on the extracted domain name, the appliance 208 proceeds to classify the domain name as a high level of risk or low level of risk at module 212. In classifying the domain name as the level of risk, the appliance 208 may utilize a list of malicious domain names 216. The list of malicious domain names 216, also referred to as a blacklist, includes a list of domain names which are directed to malicious websites. As such, the appliance 208 compares the extracted data to the list of malicious domain names 216 to identify whether the extracted domain name is considered the high level of risk. Based on the determination that the extracted domain name does not correspond to the list of malicious domain names 216, the appliance 208 may utilize a list of benign domain names 218. The list of benign domain names 218, also referred to as a whitelist, includes those domain names which are known to be directed to safe websites. If the extracted domain is classified as the high level of risk at module 212, then the appliance 208 indicates the DNS packet 102 as malicious. Based on the determination of the DNS packet 202 as malicious, the appliance 208 transmits the DNS packet 202 to an auxiliary appliance 220 to log the DNS packet 202 at module 222. If the extracted domain name is classified as the low level of risk at module 212, the appliance 208 discards the DNS packet 202 at module 224.

The DNS packet 202 includes the header and payload fields 214. The payload fields 214 are those fields in the DNS packet 202 which contains the data for extraction by the appliance 208. The payload fields 214 further includes a domain name which is extracted by the appliance 208 at module 210. The payload fields 214 include, by way of example, a question field, an answer field, an authority field, and/or an additional field. In implementations, the appliance 208 extracts the domain name in the form of a qname from the question field and/or an aname from the answer field within the payload fields 214. The domain name within the query field is referred to as the qname, while the domain name within the answer field is referred to as the aname. Although FIG. 2 illustrates the aname in answer field, implementations should not be limited as the aname may be included in the authority field and/or additional field.

At modules 210-212, the appliance 208 extracts the domain name either in the form of the qname and/or aname. Using the extracted domain name, the appliance 208 proceeds to classify the domain name as either a high level of risk or low level of risk. The classification of the domain name is determined by identifying whether the extracted domain name corresponds to at least one of the names on the list of malicious domain names (i.e., blacklist) 216. The correspondence of the extracted domain name to the blacklist means that the extracted domain name or a related ancestor domain appears on the list of malicious domain names 216. If the extracted domain name has no correspondence to the list of malicious domain names 216, the appliance proceeds to identify whether the extracted domain name has a correspondence to the list of benign domain names 218. For example, the appliance 208 extracts the domain name, "shopping.abc.com" thus the appliance 208 identifies whether "shopping.abc.com" or the related ancestor domain "abc.com" appears on the list of malicious domain names 216. In this example, the ancestor domain name, "abc.com," appears on the list of malicious domain names 216. This means that the extracted domain name "shopping.abc.com" corresponds to the list of malicious domain names 216. Modules 210-212 may be similar in functionality to modules 110-112 as in FIG. 1.

The list of malicious domain names 216 represents those domain names which are directed to known malicious websites. By processing the extracted domain name against the list of those known malicious domain names 216, the appliance 208 is able to identify if the extracted data is considered the high level of risk.

The list of benign domain names 218 represents those domain names which are directed to known safe websites. These are known to be safe domain names. The appliance 208 processes the extracted domain name against the list of benign names 218 subsequently to the list of malicious domain names 216. In other words, if the extracted domain name corresponds to none of the domain names on the list of malicious domain names 216, the appliance 208 proceeds to process the extracted domain name against the list of benign domain names 218. For example, if the extracted domain name includes "shopping.com," the appliance 208 identifies whether "shopping.com" corresponds to the list of malicious domain names 216. Since "shopping.com" does not correspond to the list of malicious domain names 216, the appliance 208 proceeds to identify whether "shopping.com" corresponds to the list of domain names 218. In this example, "shopping.com" appears on the list of benign domain names 218 thus "shopping.com" would be considered to have correspondence to 218. Thus "shopping.com" is classified as the low level of risk and the DNS packet 202 is identified as benign (i.e., not malicious).

The auxiliary appliance 220 receives the DNS packet 202 based on the appliance 208 determining the DNS packet 202 is malicious. The auxiliary appliance 220 may proceed to log the DNS packet at module 222. In implementations, the auxiliary appliance 220 is located remotely to the DNS server 204 and the appliance 208. In this manner, the auxiliary appliance 220 is considered an independent appliance form the appliance 208. The auxiliary appliance 220 may be similar in structure to the appliance 108 and 208 as in FIGS. 1-2.

At module 222, the auxiliary appliance 220 logs the DNS packet based on the determination that the DNS packet 202 is malicious. During the logging process, the DNS packet 202 is stored locally on the auxiliary appliance 220 for analysis. Such analysis may include determining whether the requesting party is infected and/or targeted device is infected. For example, module 222 may include performing a domain generation algorithm check, tracking a number of malicious DNS packets generated over a period of time from a particular requesting party and/or targeted requesting party. The analysis may indicate to the auxiliary appliance 220 whether the source of the DNS packet 202 and/or the machine hosting the domain name may be infected.

At module 224, based on the classification of the extracted domain name as the low level of risk, the appliance 208 determines the DNS packet 202 is benign. Based on the determination of the DNS packet 202 as benign, the appliance 208 proceeds to discard the DNS packet 202. Discarding the DNS packet means to drop that DNS packet which is from or directed to a safe website. This reduces the traffic which may be logged for the analysis. Although FIG. 2 illustrates module 224 as remotely located to the appliance 208, this was done for illustrations purposes as the module 224 may be located as part of the appliance 208.

Figure 3:
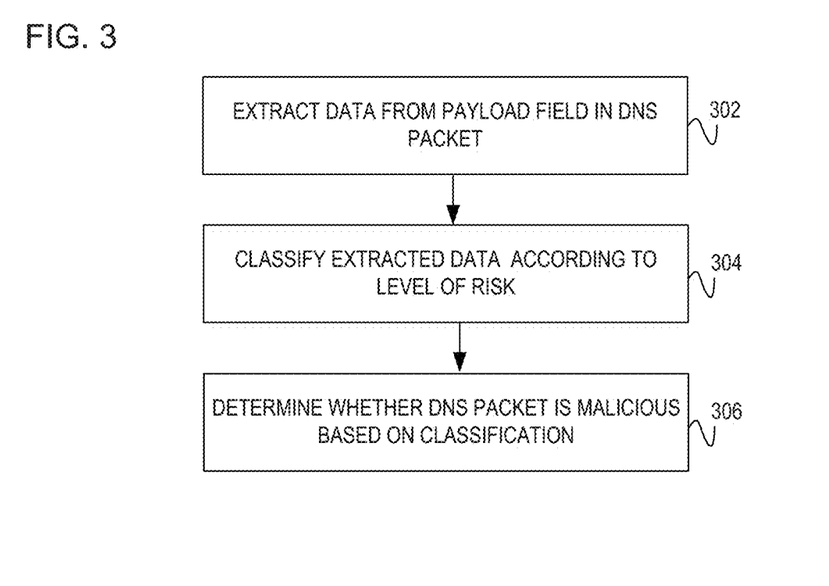
FIG. 3 is a flowchart of an example method executable by a networking device to determine if a DNS packet is malicious based on a classification of extracted data from a payload field.

FIG. 3 illustrates a flowchart of an example method to determine if a DNS packet is malicious based on a classification of extracted data from a payload field. The method is executable by a computing device to determine if the DNS packet is malicious. The computing device captures the DNS packet as traffic is transmitted between a DNS server and client(s). Using the captured DNS packet, the computing device extracts data within the payload field. The extracted data may include, by way of example, a domain name such as a qname in a question field and/or aname in a response field. Using the extracted data, the computing device classifies the extracted data according to a level of risk associated with the extracted data. Based on the classification of the extracted data, the computing device determines whether the DNS packet is malicious. In implementations, if the computing device determines the DNS packet is malicious, the computing device logs the DNS packet for further analysis. If the computing device determines the DNS packet is not malicious (e.g., benign), the computing device discards the DNS packet as the contents within the payload field are considered to be directed to non-infected machines or safe websites and thus considered safe. In discussing FIG. 3, references may be made to the components in FIGS. 1-2 to provide contextual examples. In one implementation, the appliance 104 executes operations 302-306 to determine if the DNS packet is malicious based on the classification of the extracted data from the payload field. Although FIG. 3 is described as implemented by the appliance 104, it may be executable on other suitable components. For example, FIG. 3 may be implemented in the form of executable instructions on a machine-readable storage medium 604 and 704 as in FIGS. 6-7.

At operation 302, the computing device extracts data from the payload field within the DNS packet. The computing device captures the DNS packet when traffic flows between a client and the DNS server. Capturing the DNS packet, the computing device processes the payload field which includes the data. The extracted data is the data being transmitted in the payload field of the DNS packet. As such, the extracted data by the computing device may include, by way of example, a domain name, a qname, an aname, etc. In implementations, the extracted data is dependent on the type of DNS packet. For example, the computing device may extract the qname from a DNS request packet and/or extract the aname from a resource record in a DNS response packet. Upon extracting the data from the payload field within the DNS packet, the computing device proceeds to classify the extracted data.

At operation 304, the computing device classifies the extracted data obtained at operation 302 according to the level of risk associated with the extracted data. The extracted data may be compared to a list of malicious domains (i.e., a blacklist). If the extracted data or an ancestor domain of the extracted data appears on the blacklist, the computing device classifies the DNS packet as a high level of risk. In this manner, if the extracted data and/or ancestor domains appear on the blacklist, then the extracted data corresponds to the blacklist. Upon determining that none of the list of malicious domains correspond to the extracted data and/or ancestor domains, the computing device may proceed to compare the extracted data to a list of benign domains (i.e., a whitelist). If the extracted data and/or ancestor domains correspond to the whitelist, the DNS packet is classified as a low level risk. Depending on the level of risk associated with the extracted data, the computing device determines whether the DNS packet is malicious or not malicious (i.e., benign).

At operation 306, the computing device determines whether the DNS packet is malicious based on the classification of the level of risk associated with the extracted data. If the extracted data is classified as the high level of risk, this indicates to the computing device the DNS packet is malicious. If the extracted data is classified as the low level of risk, this indicates to the computing device that the DNS packet is not malicious (i.e., benign).

Figure 4:
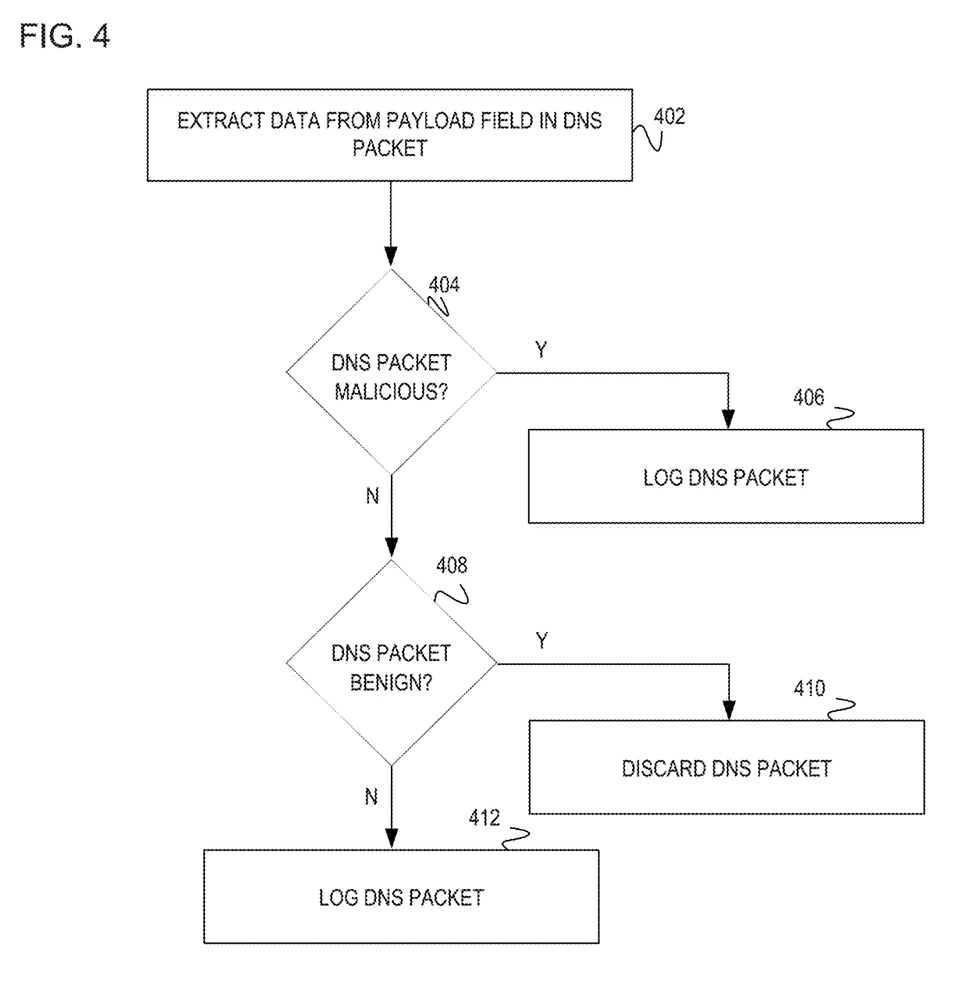
FIG. 4 is a flowchart of an example method executable by a computing device to either log a DNS packet or discard the DNS packet based on whether the DNS packet is malicious or benign, accordingly.

FIG. 4 illustrates a flowchart of an example method to either log a DNS packet or discard the DNS packet based on whether the DNS packet is malicious or benign, accordingly. The method is executable by a computing device to either log or discard the DNS packet. The computing device extracts data form the payload field in the DNS packet. Using the extracted data, the computing device compares the extracted data to a list of malicious domains. If the extracted data corresponds to the list of malicious domains, it indicates the DNS packet is malicious. In response to the determination that the DNS packet is malicious, the computing device logs the DNS packet for analysis. If the extracted data does not correspond to the list of malicious domains, the computing device proceeds to determine if the extracted data corresponds to a list of benign domains. If the extracted data corresponds to the list of benign domains, the extracted data is considered the low level of risk and indicates the DNS packet is benign. In response to the determination the DNS packet is benign, the computing device discards the DNS packet. In discussing FIG. 4, references may be made to the components in FIGS. 1-2 to provide contextual examples. In one implementation, the appliance 104 executes operations 402-412 to determine if the DNS packet is malicious and respond accordingly. Although FIG. 4 is described as implemented by the appliance 104, it may be executable on other suitable components. For example, FIG. 4 may be implemented in the form of executable instructions on a machine-readable storage medium 604 and 704 as in FIGS. 6-7.

At operation 402, the computing device extracts data from the payload field of the DNS packet. The extracted data is used to classify whether the extracted data is considered a high level of risk or a low level or risk. This level of risk is used to determine whether the DNS packet is malicious or benign as at operations 404 and 408. Operation 402 may be similar in functionality to operation 302 as in FIG. 3.

At operation 404, using the extracted data from operation 402, the computing device proceeds to determine if the DNS packet is malicious. At operation 404, the computing device processes the extracted data to a list of malicious domain names, also referred to as a blacklist. If the extracted data corresponds to the list of malicious domain names, the extracted data is classified with a high level of risk. The high level of risk indicates to the computing device that the DNS packet is malicious. Upon determining that the DNS packet is malicious, the computing device proceeds to log the DNS packet at operation 406. If the extracted data does not correspond to the blacklist, the computing device proceeds to determine if the DNS packet is benign at operation 408.

At operation 406, if the computing device determines the DNS packet is malicious as at operation 404, the computing device logs the DNS packet. In one implementation, the computing device logs the DNS packet locally while in another implementation, the computing device transmits the DNS packet to another computing device to log the DNS packet. During the logging process, the computing device stores the DNS packet to process the malicious DNS packet for analysis. Such analysis may include determining whether the requesting party is infected and/or the receiver may be infected. During the logging process, the computing device determines whether the requesting party (e.g., client) is performing a domain generation algorithm (DGA). The DGA is used to periodically generate a large number of DNS traffic that can be used as rendezvous points with the corresponding command and control servers of malware resident on infected machines. Thus, the computing device may track a number of malicious DNS packets generated over a period of time from a particular requesting party. This indicates to the computing device whether the requesting party may be infected.

At operation 408, upon the determination the DNS packet is not malicious at operation 404, the computing device determines if the DNS packet is benign. The computing device processes the extracted data to the list of benign domain names. Thus if the extracted data or if an ancestor domain of the extracted data appears on the benign list, this indicates that the extracted data is classified at the low level of risk. Classifying the extracted data at the low level of risk implies the DNS packet is benign.

At operation 410, upon the determination the DNS packet is benign at operation 408, the computing device discards the DNS packet. Discarding the DNS packet means to drop that DNS packet which are from or directed to a non-infected machine. This reduces the traffic which may be logged for the analysis.

At operation 412, upon determining the DNS packet is neither malicious nor benign, this may indicate a middle level that the DNS packet may be directed to a potentially malicious domain name. This middle level indicating the domain name as potentially malicious is also referred to as a greylist. As such, the computing device may log the DNS packet for further analysis. Operation 412 may be similar in functionality to operation 406.

Figure 5:
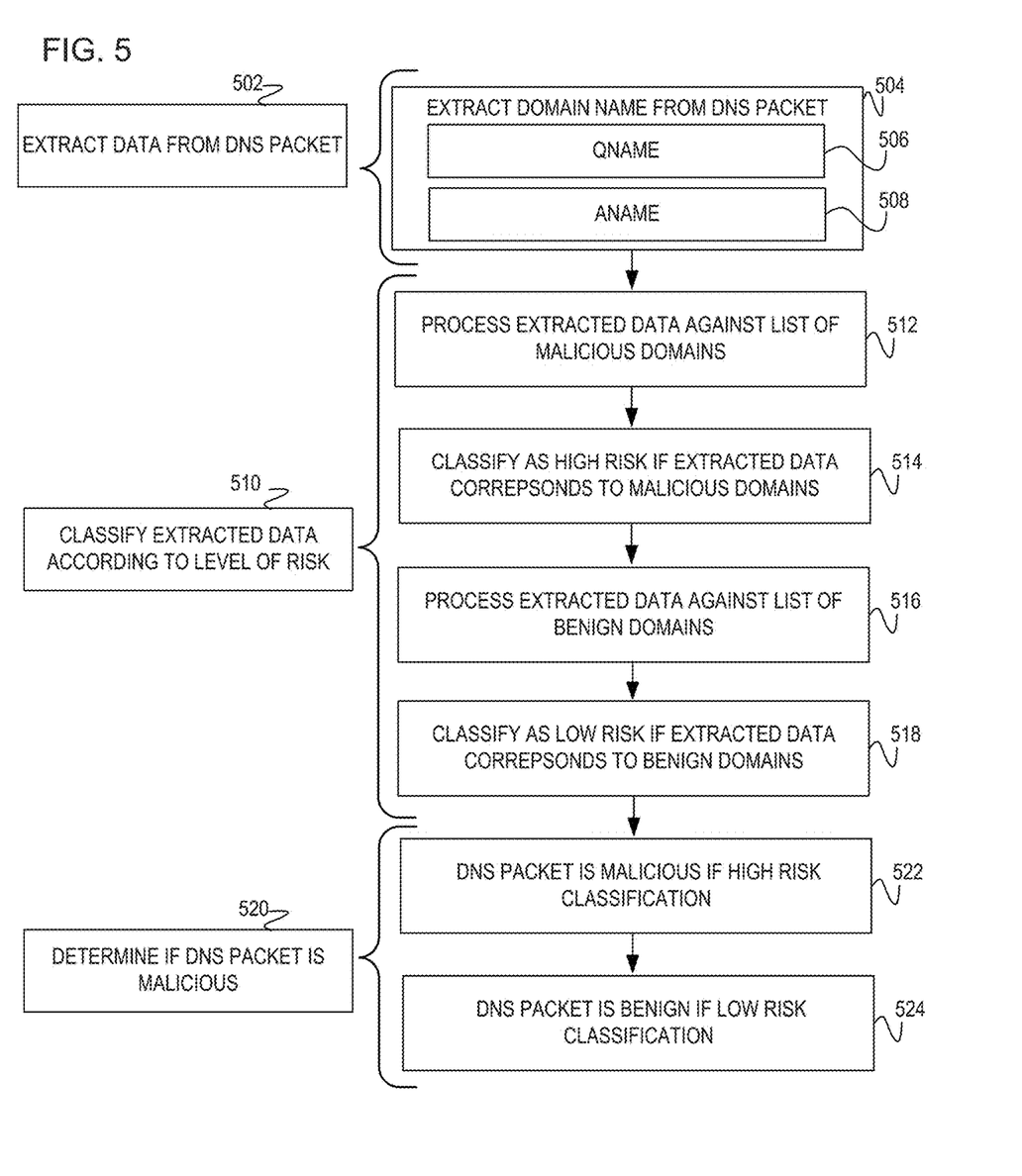
FIG. 5 is a flowchart of an example method executable by a computing device to determine if a DNS packet is malicious by classifying extracted data from a payload field within the DNS packet in accordance with a level of risk.

FIG. 5 is illustrates a flowchart of an example method to determine if a DNS packet is malicious by classifying the extracted data. The method classifies the extracted data by processing extracted data against a list of malicious domain names and subsequently against a list of benign domain names. The method is executable by a computing device to classify the extracted data from a payload field within the DNS packet as a high level of risk or low level of risk. In discussing FIG. 5, references may be made to the components in FIGS. 1-2 to provide contextual examples. In one implementation, the appliance 104 executes operations 502-524 to determine if the DNS packet is malicious and responds accordingly. Although FIG. 5 is described as implemented by the appliance 104, it may be executable on other suitable components. For example, FIG. 5 may be implemented in the form of executable instructions on a machine-readable storage medium 604 and 704 as in FIGS. 6-7.

At operation 502, the computing device extracts data from the DNS packet. The extracted data may include a domain name such as a qname and/or aname as at operations 504-508. Operation 502 may be similar in functionality to operations 302 and 402 as in FIGS. 3-4.

At operations 504-508, the computing device extracts the domain name from the payload field within the DNS packet. In implementations, the extracted domain name includes at least one of the qname and/or aname. The qname is extracted from a question field within the DNS packet while the aname is extracted from a response field, an authority field, and/or additional field as illustrated in FIG. 2. Using the domain name, the computing device proceeds to classify the extracted data.

At operation 510, the computing device classifies the extracted data according to the level of risk. In implementations, the computing device extracts the domain name and processes the domain name against the list of malicious domain names (i.e., blacklist) to classify the domain name as the high level of risk. Upon determining neither the domain name nor an ancestor domain correspond to the blacklist, the computing device proceeds to process the domain name against the list of benign domain names (i.e., whitelist). If the extracted domain name corresponds to the whitelist, the extracted data is classified as the low level of risk. Operation 510 may be similar in functionality to operation 304 as in FIG. 3.

At operation 512, the computing device processes the extracted domain name against the list of malicious domain names. In this manner, the computing device determines whether the extracted domain name corresponds to one of the domain names in the blacklist. The correspondence of the extracted domain name includes searching the blacklist for the extracted domain name or an ancestor domain name related to the extracted domain name. If the blacklist includes a similar extracted domain name or an ancestor domain name, the extracted domain is classified as the high level of risk as at operation 514.

At operation 514, based on the determination that the extracted domain name corresponds to at least one of the domain names listed on the blacklist, the computing device classifies the extracted data (e.g., extracted domain name) as the high level of risk. Classifying the extracted data as the high level of risk means that the extracted data is directed towards a malicious domain. Thus, the high level of risk classification indicates the DNS packet is malicious.

At operation 516, if the extracted data corresponds to none of the domain names on the blacklist, the computing device proceeds to process the extracted data against the list of benign domain names. If the extracted data corresponds to one of the domain names on the list of benign domain names (i.e., whitelist), the computing device proceeds to classify the extracted data as the low level of risk.

At operation 518, based on the determination that the extracted data corresponds to the list of benign domain names, the computing device classifies the extracted data as the low level of risk. The low level risk means that the extracted data is directed to a safe domain name. Classifying the extracted data as the low level of risk indicates to the computing device that the DNS packet is benign.

At operation 520, the computing device uses the classification of the extracted data to determine if the DNS packet is malicious. Operation 520 may be similar in functionality to operation 306 as in FIG. 3.

At operation 522, if the computing device classifies the extracted data as the high level of risk classification at operation 510, this indicates the DNS packet is malicious. Based on determining the DNS packet is malicious, the computing device may proceed to log the DNS packet.

At operation 524, if the computing device classifies the extracted data as the low level of risk at operation 510, this indicates the DNS packet is benign. Based on determining the DNS packet as benign, the computing device may proceed to discard the DNS packet.

Figure 6:
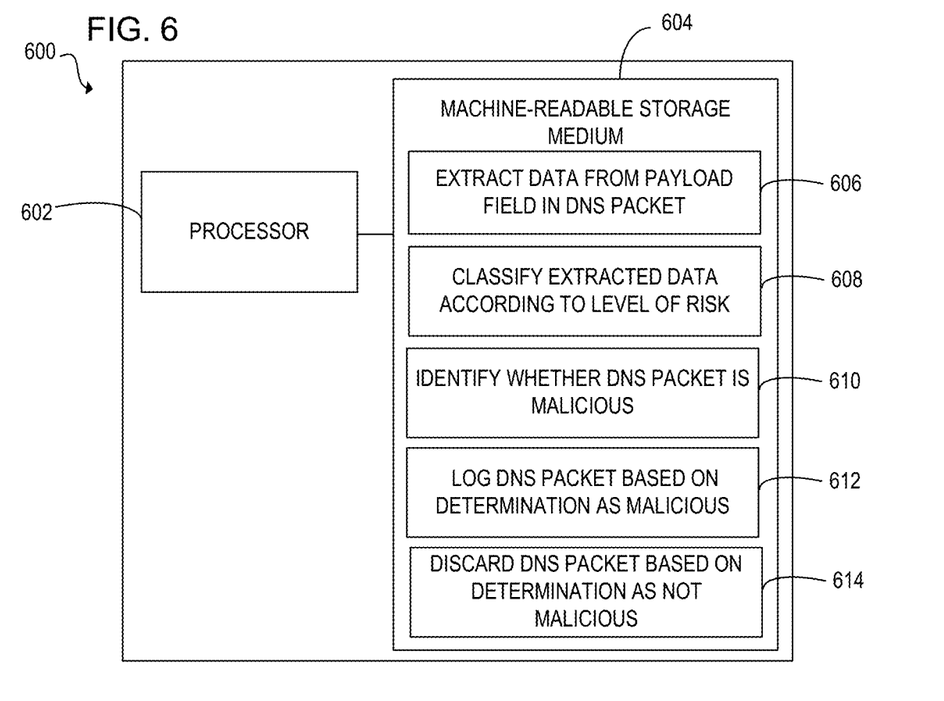
FIG. 6 is a block diagram of an example computing device with a processing resource to execute instructions in a machine-readable storage medium for either logging or discarding a DNS packet based on whether the DNS packet is malicious or benign.

FIG. 6 is a block diagram of a computing device 600 with a processing resource 602 to execute instructions 606-614 within a machine-readable storage medium 604. Specifically, the computing device 600 with the processing resource 602 is to identify whether a DNS packet is malicious and in turn either log the DNS packet or discard the DNS packet, Although the computing device 600 includes a processing resource 602 and a machine-readable storage medium 604, it may also include other components that would be suitable to one skilled in the art. For example, the computing device 600 may include the appliance 104 as in FIG. 1. The computing device 600 is an electronic device with the processing resource 602 capable of executing instructions 606-614 and as such embodiments of the computing device 600 include an appliance, networking device, server, switch, mobile device, desktop computer, laptop, tablet, or other type of electronic device capable of executing instructions 606-614. The instructions 606-614 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-614 to identify whether the DNS packet is malicious to then either log the DNS packet or to discard the DNS packet. Specifically, the processing resource 602 executes instructions 606-614 to: extract data from the payload field within the DNS packet; classify the extracted data as a level of risk, such as a high level of risk or low level or risk; identify whether the DNS packet is malicious based on classification of the extracted data; log the DNS packet upon the determination that the DNS packet is malicious; and discard the DNS packet upon the determination that the DNS packet is not malicious (e.g., benign).

The machine-readable storage medium 604 includes instructions 606-614 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Figure 7:
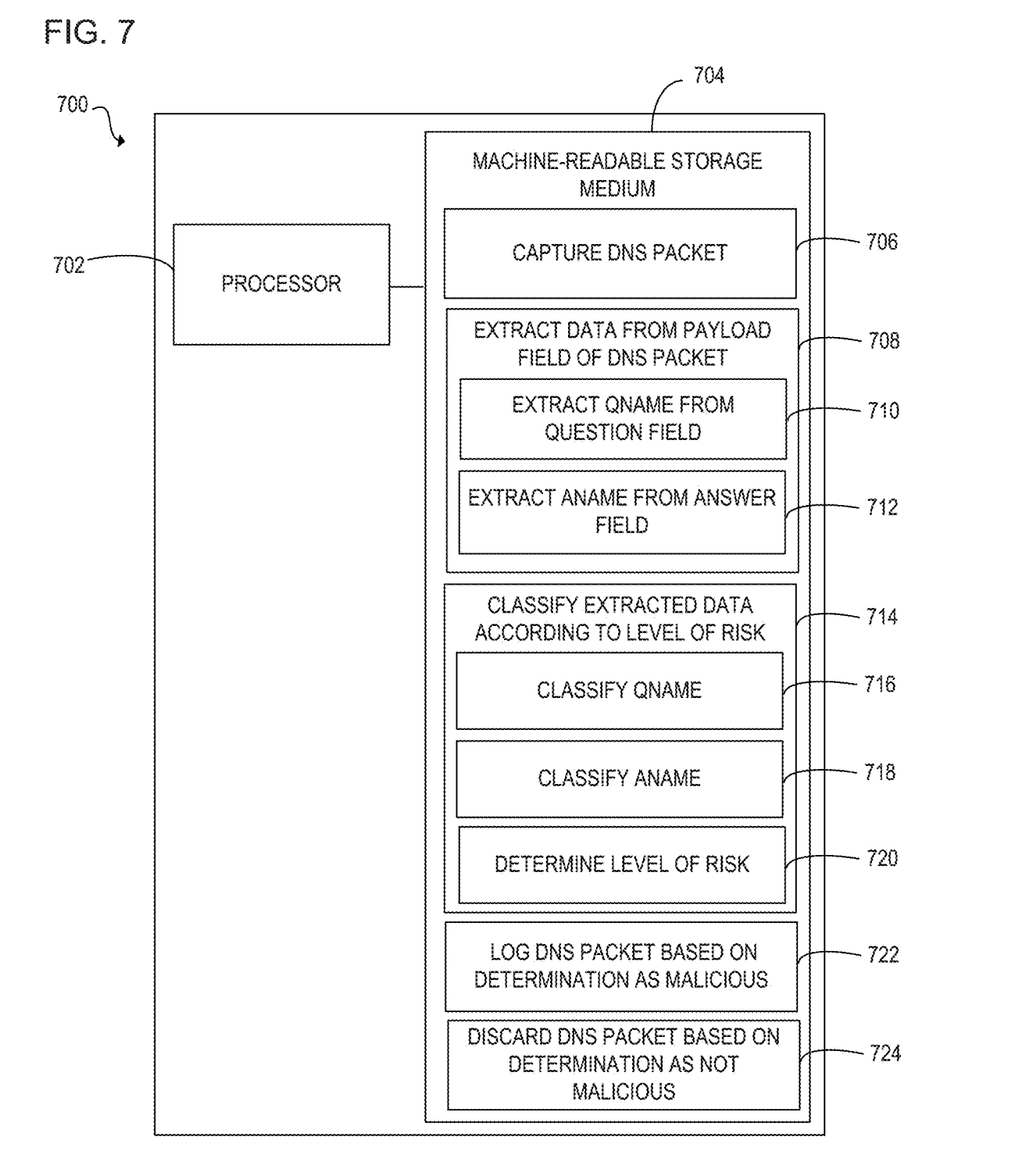
FIG. 7 is a block diagram of an example computing device with a processing resource to execute instructions in a machine-readable storage medium for either logging or discarding a DNS packet based on a classification of extracted data from the DNS packet.

FIG. 7 is a block diagram of computing device 700 with a processing resource 702 to execute instructions 706-724 within a machine-readable storage medium 704. Specifically, the computing device 700 with the processing resource 702 is to capture a DNS packet and extract data from a payload field within the DNS packet. The extracted data is classified according to a level of risk and based on the classification, the computing device 700 may proceed to identify whether the DNS packet is malicious. Although the computing device 700 includes processing resource 702 and machine-readable storage medium 704, it may also include other components that would be suitable to one skilled in the art. For example, the computing device 700 may include the appliance 104 as in FIG. 1. The computing device 700 is an electronic device with the processing resource 702 capable of executing instructions 706-724 and as such embodiments of the computing device 700 include an appliance, networking device, server, switch, mobile device, desktop computer, laptop, tablet, or other type of electronic device capable of executing instructions 706-724. The instructions 706-724 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processing resource 702 may fetch, decode, and execute instructions 706-724 to capture the DNS packet and identify whether the DNS packet is malicious. Specifically, the processing resource 702 executes instructions 706-724 to: capture the DNS packet from traffic to a DNS server; extract data from the payload field in the DNS packet including extracting at least a qname and/or aname; extract the qname from a question field within the DNS packet; extract the aname from an answer field within the DNS packet; classify the extracted data according to a level of risk; classify the qname; classify the aname; determine the level of risk associated with the extracted data; identify whether the DNS packet is malicious based on the level of risk associated with the extracted data; log the DNS packet if the level of risk is high enough to indicate the DNS packet is malicious; and discard the DNS packet if the level of risk is low enough to indicate the DNS packet is not malicious (e.g., benign).

The machine-readable storage medium 704 includes instructions 706-724 for the processing resource 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processing resource 702 to fetch, decode, and/or execute instructions of the machine-readable storage medium 704. The application and/or firmware may be stored on the machine-readable storage medium 704 and/or stored on another location of the computing device 700.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A method executed by a computing device, the method comprising:
    extracting data from a payload field within a domain name system (DNS) packet, wherein the extracted data comprises a qname from a question field within the DNS packet;
    classifying the extracted data according to a level of risk associated with the extracted data, wherein classifying the extracted data according to the level of risk associated with the extracted data comprises:
        processing the extracted data against a list of malicious domains;
        classifying the extracted data as a high level risk responsive to a determination that the extracted data corresponds to the list of malicious domains;
        processing the extracted data against a list of benign domains responsive to a determination that the extracted data does not correspond to the list of malicious domains;
        classifying the extracted data as a low level risk responsive to a determination that the extracted data corresponds to the list of benign domains; and
        in response to the determination that the extracted data does not correspond to the list of malicious domains, and a determination that the extracted data does not correspond to the list of benign domains, classifying the extracted data at a further level of risk between the high level risk and the low level risk; and
    determining whether the DNS packet is malicious based on the classification.

2. The method of claim 1, further comprising:
    based on a determination that the DNS packet is malicious, causing logging of the DNS packet for analysis; and
    based on a determination the DNS packet is not malicious, discarding the DNS packet.

3. The method of claim 1, wherein the extracted data includes multiple domain names, and wherein classifying the multiple domain names according to the level of risk associated with the multiple domain names comprises:
    classifying the multiple domain names as the high level risk based on at least one of the multiple domain names corresponding to the list of malicious domains; and
    classifying the multiple domain names as the low level risk based on at least one of the multiple domain names corresponding to the list of benign domains and none of the multiple domain names corresponding to the list of malicious domains.

4. The method of claim 1, wherein the level of risk includes at least one of a blacklist, a whitelist, or a greylist.

5. The method of claim 1, wherein extracting the data from the payload field within the DNS packet comprises:
    extracting a domain name from the payload field within the DNS packet, wherein processing the extracted data against the list of malicious domains comprises comparing the domain name to the list of malicious domains, wherein classifying the extracted data as the high level risk is responsive to the domain name appearing in the list of malicious domains, wherein processing the extracted data against the list of benign domains comprises comparing the domain name to the list of benign domains, and wherein classifying the extracted data as the low level risk is responsive to the domain name appearing in the list of benign domains.

6. The method of claim 3, wherein the multiple domain names include a first domain name extracted from the payload field, and an ancestor domain name of the first domain name.

7. The method of claim 1, wherein processing the extracted data against the list of malicious domains occurs prior to processing the extracted data against the list of benign domains.

8. A system comprising:
    a processor; and
    a non-transitory storage medium storing instructions executable on the processor to:
        receive a domain name system (DNS) packet sent to or transmitted from a DNS server;
        extract data from a payload field within the DNS packet, wherein the extracted data comprises a qname from a question field within the DNS packet;

classify the extracted data according to a level of risk associated with the extracted data, wherein the classifying of the extracted data comprises:
processing the extracted data against a list of malicious domains;
classifying the extracted data as a high level risk responsive to a determination that the extracted data corresponds to the list of malicious domains;
processing the extracted data against a list of benign domains after a determination that the extracted data does not correspond to the list of malicious domains;
classifying the extracted data as a low level risk responsive to a determination that the extracted data corresponds to the list of benign domains; and
in response to the determination that the extracted data does not correspond to the list of malicious domains, and a determination that the extracted data does not correspond to the list of benign domains, classifying the extracted data at a further level of risk between the high level risk and the low level risk; and
determine whether the DNS packet is malicious based on the classifying of the extracted data according to the level of risk associated with the extracted data.

9. The system of claim 8, wherein the instructions are executable on the processor to:
cause logging of the DNS packet in response to a determination that the DNS packet is malicious; and
discard the DNS packet in response to a determination that the DNS packet is not malicious.

10. The system of claim 8, wherein the system is remotely located from the DNS server.

11. The system of claim 8, wherein the extracted data from the payload field within the DNS packet comprises a domain name within the DNS packet.

12. A non-transitory machine-readable storage medium comprising instructions that when executed cause a computing device to:
extract data from a payload field within a domain name system (DNS) packet, wherein the extracted data comprises a qname from a question field within the DNS packet;
classify the extracted data according to a level of risk associated with the extracted data, wherein the classifying of the extracted data comprises:
processing the extracted data against a list of malicious domains;
classifying the extracted data as a high level risk responsive to a determination that the extracted data corresponds to the list of malicious domains;
processing the extracted data against a list of benign domains responsive to a determination that the extracted data does not correspond to the list of malicious domains;
classifying the extracted data as a low level risk responsive to a determination that the extracted data corresponds to the list of benign domains; and
in response to the determination that the extracted data does not correspond to the list of malicious domains, and a determination that the extracted data does not correspond to the list of benign domains, classifying the extracted data at a further level of risk between the high level risk and the low level risk; and
identify whether the DNS packet is malicious based on the level of risk;
log the DNS packet based on an identification of the DNS packet as malicious.

13. The non-transitory machine-readable storage medium of claim 12, wherein the instructions when executed cause the computing device to:
capture the DNS packet sent to or transmitted from a DNS server.

14. The non-transitory machine-readable storage medium of claim 12,
wherein the high level risk indicates the DNS packet is malicious, and the low level risk indicates the DNS packet is not malicious.

15. The non-transitory machine-readable storage medium of claim 13, wherein the extracted data comprises an aname from an answer field within the DNS packet.

16. The non-transitory machine-readable storage medium of claim 12, wherein the processing of the extracted data against the list of malicious domains occurs prior to the processing of the extracted data against the list of benign domains.

* * * * *